(12) United States Patent
Bosch et al.

(10) Patent No.: US 10,270,843 B2
(45) Date of Patent: *Apr. 23, 2019

(54) CHAINING SERVICE ZONES BY WAY OF ROUTE RE-ORIGINATION

(71) Applicant: Cisco Technology, Inc., San Jose, CA (US)

(72) Inventors: Hendrikus G. P. Bosch, Aalsmeer (NL); James Guichard, New Boston, NH (US); Dave Barach, Boxborough, MA (US); Alessandro Duminuco, Vibonati (IT); Luyuan Fang, Holmdel, NJ (US); Paul Quinn, San Francisco, CA (US); Rex Fernando, Dublin, CA (US); David Ward, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/711,235

(22) Filed: Sep. 21, 2017

(65) Prior Publication Data

US 2018/0013821 A1 Jan. 11, 2018

Related U.S. Application Data

(63) Continuation of application No. 13/898,932, filed on May 21, 2013, now Pat. No. 9,826,025.

(51) Int. Cl.
*H04L 29/08* (2006.01)
*H04L 12/715* (2013.01)
*H04L 12/751* (2013.01)

(52) U.S. Cl.
CPC .............. *H04L 67/10* (2013.01); *H04L 45/02* (2013.01); *H04L 45/04* (2013.01)

(58) Field of Classification Search
CPC ......... H04L 45/02; H04L 45/04; H04L 67/10; H04L 45/302; H04L 45/306;
(Continued)

(56) References Cited

U.S. PATENT DOCUMENTS

| | | | |
|---|---|---|---|
| 7,558,261 | B2 | 7/2009 | Arregoces et al. |
| 7,571,470 | B2 | 8/2009 | Arregoces et al. |

(Continued)

FOREIGN PATENT DOCUMENTS

| | | | |
|---|---|---|---|
| CN | 1414753 | A | 4/2003 |
| CN | 102195855 | A | 9/2011 |
| JP | 2007067505 | A | 3/2007 |

OTHER PUBLICATIONS

Rosen, et al., "BGP/MPLS IP Virtual Private Networks (VPNs)," Network Working Group, RFC 4364, Feb. 2006, pp. 1-47.

(Continued)

*Primary Examiner* — Greg C Bengzon
(74) *Attorney, Agent, or Firm* — Edell, Shapiro & Finnan, LLC

(57) ABSTRACT

Presented herein are techniques for use in a network environment that includes one or more service zones, each service zone including at least one instance of an in-line application service to be applied to network traffic and one or more routers to direct network traffic to the at least one service, and a route target being assigned to a unique service zone to serve as a community value for route import and export between routers of other service zones, destination networks or source networks via a control protocol. An edge router in each service zone or destination network advertises routes by its destination network prefix tagged with its route target. A service chain is created by importing and exporting of destination network prefixes by way of route targets at edge routers of the service zones or source networks.

18 Claims, 9 Drawing Sheets

(58) Field of Classification Search
CPC .............. H04L 45/3065; H04L 45/308; H04L 67/1061; H04L 67/1063; H04L 67/1065; H04L 67/1068; H04L 67/141; H04L 67/148; H04L 67/2814; H04L 67/2819; H04L 45/28; H04L 2012/5621; H04L 45/26; H04L 45/586; H04L 12/5601; H04L 2012/562; H04L 45/00; H04L 45/10; H04L 41/12; H04L 45/026; H04L 45/22; H04L 47/36; H04L 49/552; H04L 69/40; H04L 2012/5623; H04L 2012/563; H04L 2012/5642; H04L 2012/5685; H04L 2212/00; H04L 45/06; H04L 45/122; H04L 45/20; H04L 45/24; H04L 45/34; H04L 45/44; H04L 45/46; H04L 45/48; H04L 45/502; H04L 45/505; H04L 45/507; H04L 45/52; H04L 45/54; H04L 45/60; H04L 45/7457; H04L 49/70; H04L 67/1002; H04L 63/0254; H04L 47/10; H04L 47/2425; H04L 67/1006; H04L 67/1014; H04L 12/462; H04L 45/50; H04L 63/0218; H04L 63/0227; H04L 63/0464; H04L 63/1408; H04L 63/1416; H04L 63/1425; H04L 63/1441; H04L 63/166; H04L 63/20; H04L 67/101; H04L 67/1027; H04L 67/1097; H04L 67/2838; H04L 67/327; H04L 69/08; H04L 69/22; H04L 45/42; H04L 45/12; H04L 45/123; H04L 45/14; H04L 12/4625; H04L 29/06; H04L 29/08072; H04L 41/0823; H04L 41/0873; H04L 41/0893; H04L 41/0896; H04L 41/22; H04L 41/5019; H04L 45/021; H04L 45/125; H04L 45/126; H04L 45/38; H04L 45/64; H04L 45/66; H04L 45/70; H04L 45/7453; H04L 47/11; H04L 47/12; H04L 47/24; H04L 49/355; H04L 49/90; H04L 61/6068; H04L 65/4084; H04L 67/1076; H04L 67/1089; H04L 67/1095; H04L 67/12; H04L 67/16; H04L 67/18; H04L 67/289; H04W 40/248; H04W 28/14; H04W 40/246; H04W 40/32; H04W 40/36
See application file for complete search history.

(56) References Cited

U.S. PATENT DOCUMENTS

| | | | |
|---|---|---|---|
| 7,610,375 B2 | 10/2009 | Portolani et al. | |
| 7,643,468 B1 | 1/2010 | Arregoces et al. | |
| 7,657,940 B2 | 2/2010 | Portolani et al. | |
| 8,311,045 B2 | 11/2012 | Quinn et al. | |
| 8,442,043 B2 | 5/2013 | Sharma et al. | |
| 8,700,801 B2 | 4/2014 | Medved et al. | |
| 8,954,491 B1 | 2/2015 | Medved et al. | |
| 9,015,299 B1 | 4/2015 | Shah | |
| 9,591,011 B2 * | 3/2017 | Zisapel | H04L 63/1441 |
| 2002/0150094 A1 | 10/2002 | Cheng et al. | |
| 2003/0128668 A1 | 7/2003 | Yavatkar et al. | |
| 2004/0120355 A1 | 6/2004 | Kwiatkowski | |
| 2005/0289244 A1 | 12/2005 | Sahu et al. | |
| 2006/0092950 A1 | 5/2006 | Arregoces et al. | |
| 2006/0095960 A1 | 5/2006 | Arregoces et al. | |
| 2006/0209716 A1 | 9/2006 | Previdi et al. | |
| 2006/0291446 A1 | 12/2006 | Caldwell et al. | |
| 2007/0058568 A1 | 3/2007 | Previdi et al. | |
| 2008/0177896 A1 | 7/2008 | Quinn et al. | |
| 2009/0279536 A1 | 11/2009 | Unbehagen et al. | |
| 2010/0080222 A1 | 4/2010 | Mohapatra et al. | |
| 2010/0165985 A1 | 7/2010 | Sharma et al. | |
| 2011/0128888 A1 | 6/2011 | Buob et al. | |
| 2011/0271007 A1 | 11/2011 | Wang et al. | |
| 2012/0051221 A1 | 3/2012 | Bui et al. | |
| 2012/0144066 A1 | 6/2012 | Medved et al. | |
| 2012/0158976 A1 | 6/2012 | Van der Merwe et al. | |
| 2012/0213218 A1 | 8/2012 | Yilmaz et al. | |
| 2012/0224536 A1 | 9/2012 | Hahn et al. | |
| 2012/0290716 A1 | 11/2012 | Ogielski et al. | |
| 2012/0307825 A1 | 12/2012 | Hui et al. | |
| 2012/0314618 A1 | 12/2012 | Ben-Houidi et al. | |
| 2013/0028140 A1 | 1/2013 | Hui et al. | |
| 2013/0031271 A1 | 1/2013 | Bosch et al. | |
| 2013/0041982 A1 | 2/2013 | Shi et al. | |
| 2013/0191688 A1 | 7/2013 | Agarwal et al. | |
| 2013/0201909 A1 | 8/2013 | Bosch et al. | |
| 2013/0219046 A1 | 8/2013 | Wetterwald et al. | |
| 2013/0272305 A1 | 10/2013 | Lefebvre et al. | |
| 2014/0307744 A1 | 10/2014 | Dunbar et al. | |
| 2014/0376371 A1 | 12/2014 | Flinck et al. | |

OTHER PUBLICATIONS

Y. Rekhter, et al., RFC 3107, "Carrying Label Information in BGP-4", Network Working Group, May 2001, 8 pages.

Fernando et al., "Virtual Topologies for Service Chaining in BGP IP VPNs; draft-rfernando-l3vpn-service-chaining-01", Internet Engineering Task Force, Feb. 25, 2013, 16 pages.

Fang et al., "BGP IP VPN Virtual PE; draft-fang-l3vpn-virtual-pe-02", Internet Engineering Task Force, Apr. 7, 2013, 26 pages.

International Search Report and Written Opinion in counterpart International Application No. PCT/US2014/036907, dated Nov. 10, 2014, 11 pages.

English translation of the First Office Action in corresponding Chinese Application No. 201480029433.8, dated Oct. 24, 2017, 10 pages.

* cited by examiner

CHAINING SERVICE ZONES BY WAY OF ROUTE RE-ORIGINATION

CROSS REFERENCE TO RELATED APPLICATION

This application is a continuation of U.S. application Ser. No. 13/898,932, filed May 21, 2013, the entirety of which is incorporated herein by reference.

TECHNICAL FIELD

The present disclosure relates to networking, such as for service providers.

BACKGROUND

Network operators are increasingly monetizing their infrastructure with services. Services range from mobile line termination, lawful interception, charging, but also application-specific (in-line) services such as Hypertext Transfer Protocol (HTTP) proxies, Transport Control Protocol (TCP) optimizers, firewalls, and Network Address Translation (NAT) functions.

In a service-routed infrastructure used by a network operator, a chain of services can alter traffic between originating nodes and remote, possibly Internet hosted services. All packets to and from the originating node are subjected to one or more of these services.

DESCRIPTION OF EXAMPLE EMBODIMENTS

Overview

Presented herein are techniques for use in a network environment that includes one or more service zones, each service zone including at least one instance of an in-line application service to be applied to network traffic and one or more routers to direct network traffic to the at least one service, and a route target being assigned to a unique service zone to serve as a community value for route import and export between routers of other service zones, destination networks or source networks via a control protocol. An edge router in each service zone or destination network advertises routes by its destination network prefix tagged with its route target. A service chain is created by importing and exporting of destination network prefixes by way of route targets at edge routers of the service zones or source networks.

Example Embodiments

Figure 1:
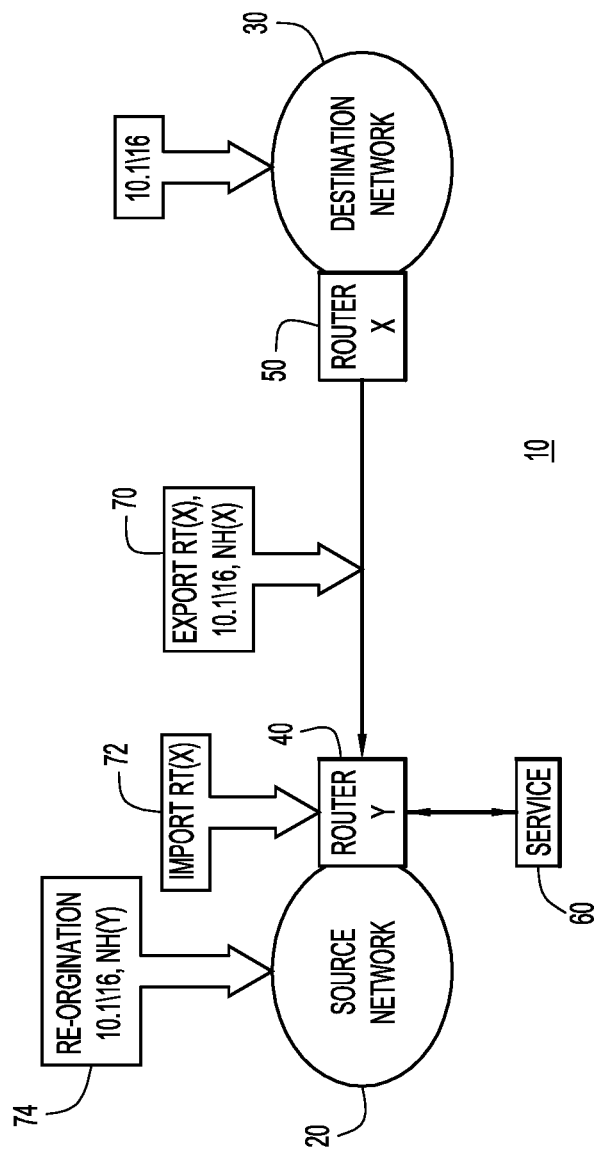
FIG. 1 is a block diagram illustrating a network environment comprising one or more networks each including at least one instance of a service to which network traffic can be directed for application of a service.

FIG. 1 shows an example of a service network infrastructure shown generally at reference numeral 10. This figure shows a service routing extranet enabled using RFC 4364 route target import/export techniques. In this example, there is a source network 20, a destination network 30, a router 40 on the edge of source network 20 and a router 50 on the edge of destination network 30. The router 40 is connected to an in-line application service 60, which may be for example, a virtual or physical firewall or any service useful to be applied to network traffic, further examples of which are described hereinafter. Router 40 and service 60 are considered a service zone.

Extranets are useful to forward traffic through a service by re-originating routes of a destination network locally. RFC 4364 provides a method by which a service provider may use an Internet Protocol (IP) or Multiprotocol Label Switching (MPLS) backbone to provide IP Virtual Private Networks (VPNs) for its customers. RFC 4364 defines a way to use extranets to build Layer-3 (L3) VPNs between customer sites. Routes are distributed and tagged with a route target (RT). In this embodiment of extranets, a route target is assigned to a unique service zone to serve as a community value for route import and export between routers via a control protocol. When imported by the source network 20, the "border" router 40 re-originates the advertised destination network IP prefix of an upstream destination network with itself as next hop. Router 40 is also denoted router Y and router 50 is also denoted router X. Traffic routed to the destination network 30 through router 40 is forced through the service 60.

In the example of FIG. 1, the destination network 30 is part of an extranet on the IP address 10.1/16. As shown at reference numeral 70, router 50 (router X) advertises, via a control protocol such as the Border Gateway Protocol (BGP), that it is serving 10.1/16, with next hop "X" and associates this with route target RT(X). Router 40 (router Y) is configured to import all of the routes tagged with RT(X) and in so doing learns that there is a route to destination network 10.1/16 with the particular next hop NH(X) and an associated MPLS label (not shown). Router 40 (router Y) imports 10.1/16 based on the route target RT(X) as shown at reference numeral 72. Thus, router 40 (router Y) can now communicate with the destination network 30 via router 50 (router X). Similar operations are followed for IPv6 networks.

Router 40 (router Y) is also configured to maintain attachment circuits (as defined in RFC 4364) towards the service 60. An attachment circuit is a physical local area network connection, a virtual local area network or other connection from the router 40 (router Y) to the device that is providing the service 60. Again, the service 60 may be embodied in or as a physical or virtual device. Thus, the attachment circuit can be a VLAN passing through a hypervisor kernel, a tunnel through the hypervisor kernel, etc. Router 40 (router Y) ensures that all traffic destined for 10.1/16 is forced through the service 60.

If Router 40 (router Y) knows how to forward traffic to destination network at 10.1/16, it needs to inform the source network 20 that it has a route to destination network 30. To this end, router 40 (router Y) re-originates 10.1/16, with itself as next hop, in the source network 20 so that elements in the source network 20 know that it is serving 10.1/16, as shown at reference numeral 74.

When the router 40 (router Y) forces traffic through the service 60, this effectively becomes a service chain of length "1". All traffic to go from the source network 20 to the destination network 30 is forced by router 40 (router Y) through the service 60. Thus, upon receiving the MPLS label associated with network 10.1/16 from router 50 (X), this tells the router 40 (router Y) to push the traffic down to the service 60 and not directly to router 50 (router X). The service 60 will apply one or more rules or other processing, send the packet (post-processing by the service) back to router 40 (router Y), and the router 40 (router Y) will forward that traffic to router 50 (router X) by way of the MPLS label associated with router 50 (X). As a result, all network elements in source network 20 that wish to send traffic to the destination network 30 will send that traffic to router 40 (router Y). The intelligence to perform these operations may be embodied in hardware and/or software appropriately configured in a router, e.g., router 40 (router Y). Once again routers 40 (router Y) and 50 (router X) may be physical network devices or virtual network devices (e.g., virtual machine software running on a hypervisor in physical server). In the later case, this capability is embodied by appropriately configured software running in the virtual machine or other software process for the virtual network device.

It is important for a service provider to dynamically construct longer or shorter service chains by installing new or removing old services "on-the-fly" and on-demand. As an example, a mobile service provider may need to install a new TCP optimizer in a service chain for mobile subscribers to enhance TCP performance over a cellular link. As described separately, in one instance, these services are implemented by virtual service appliances and operate on data center resources. The insertion and deletion of services in a chain is referred to as "horizontally scaling" the service chain.

In addition to horizontal scaling, there is vertical scaling. Oftentimes predicting the amount of resources required to operate a service in a service chain is difficult. As such, it is important for a service provider to dynamically increase or reduce the capacity of a service in a service chain on a per-service basis. Extra demand in one service does not necessarily lead to extra demands to capacity in other services. This is called the "per-service right-sizing" of resources used for a particular service.

Service appliances are typically used as "black boxes", either as tangible network elements or executing on a virtual machine. It is important for a service provider to use best-in-class services that may or may not have been designed to interwork with other services in a service chain. From a data-plane perspective, the "interface" to such a service should only be based on sending and receiving IP packets potentially encapsulated by an Ethernet header or other layer-2 encapsulation mechanism. These Ethernets can be real or virtualized. The service instances may be embedded in a modified layer-3 Virtual Private Network (VPN) described herein to provide both horizontal and vertical scaling.

Each service instance is "managed and serviced" by one or more PE routers that maintain attachment circuits to the service instance. Such a PE router can be a physical PE router, or can be hosted in a virtualized form and executing on a hypervisor's virtual machine. The term (virtual) PE router is also referred herein simply as an "edge router" and except in certain instances, these terms are used interchangeably herein. We recognize two forms of a PE router: a version operating as a virtual network appliance (i.e., virtual machine) on or in a hypervisor kernel and connecting to the service instance via a hypervisor kernel tunnel (i.e., tunctl (8)) or virtual Ethernet controller (e.g., Single Root Input/Output Virtualization, SR-IOV) functionality on one hand, or one where a PE router connects over a (virtualized) network (e.g., VLAN, IP-tunnel) on the other hand to one or more (virtual) service instances. In the former case, a specific virtual PE is used to send IP packets to and receive IP packets from a service instance. The service instance and virtual PE can be co-resident on a hypervisor kernel. In the latter case IP packets are directed from a (virtual) PE to the service instance by sending, e.g. Ethernet frames, to the service, and returned to the (virtual) PE by making it the default gateway of the service instance. In this case, the (virtual) PE does not need to be co-resident on a hypervisor kernel.

It is not uncommon in traditional routing techniques to separate forwarding functionality from signaling functionality, and to maintain proprietary interfaces between control plane and forwarding plane. This is no different for (virtual) PEs, such as forwarding engines operating on virtual machines, embedded in hypervisor kernels, or even in traditional routers. Similarly, integrated control planes and separated control planes control the forwarding plane by way of open or closed interfaces.

Each service instance manages one or more sessions. A session is defined as an end-to-end application connection, typically identified through its 5-tuple: source and destination address, protocol type and source and destination port, also referred to herein as session flow parameters. Note that other "types" of sessions may exist too, for example, if multiple of these end-to-end connections go together to form a session. The latter may be the case for voice and IP Multimedia System (IMS) solutions.

The collection of (virtual) PEs serving a particular service combined with the zone's (virtual) PE routers is called a "service zone." Service zones are described in more detail in connection with FIGS. 2-4. Each of the (virtual) PEs in a zone maintains virtual routing and forwarding (VRF) functions for inter-service-zone traffic and a service routing and forwarding (SRF) function to direct packets within the service zone to the appropriate service instance. SRFs maintains the mappings between the service instances and the application sessions, while VRFs are linked by way of IP-in-IP or MPLS tunnels to subsequent (virtual) PE routers, and maintain the attachment circuits to service instances. SRFs maintain per-session routing information, whereas VRFs only maintain aggregate routing information to route traffic from VRF to VRF. An SRF and a VRF may be integrated into a single data structure on a (virtual) PE. SRFs are described in more detail hereinafter in connection with FIGS. 5-8.

The techniques presented herein are directed to performing several functions for managing of service zone traffic flow:

1. How to set up chains of service zones and establish adjacencies between (virtual) PEs in service zones using VRFs and how to manage those chains.

2. How to establish mapping of sessions between (virtual) PEs/SRFs and the actual (virtual) appliances based on 5-tuple routing, i.e., session routing.
3. How to distribute session-mappings between all (virtual) PEs/SRFs to enable all (virtual) PEs/VRFs to provide session routing within a zone.
4. How to provide for elastic service support on a per service zone and per (virtual) PE basis i.e. how to support "vertical scaling".
5. How to support dynamic changes of the length of the chain, i.e. how to support "horizontal scaling".

A series of techniques are presented herein for a comprehensive method for managing services.

Presented herein first is an extension to the RFC 4364 extranet model to allow for arbitrary long service chains. Extranet services are chained by properly assigning route targets to service zone edge routers/VRFs and "leaking" aggregate routes through the VRFs. This is described in connection with FIGS. 2-4. Subsequently, the arbitrary service chain concepts are extended with session specific routing within a service zone through what is referred to herein as a session routing and forwarding (SRF) function. The SRF function maintains the mapping between the actual service (instances) and the flows on which the service instances operate. SRF functions maintain disaggregated service routing state. To establish VRF chaining, each VRF is provisioned with two service zone route targets in both directions, one to tag advertised/re-originated routes with and one to import routes from the "next" service zone. Chaining is managed through establishing these route targets in service zone edge routers/VRFs. Route distribution within a service zone is described hereinafter in connection with FIGS. 5-8.

Service Chains of Arbitrary Length

Figure 2:
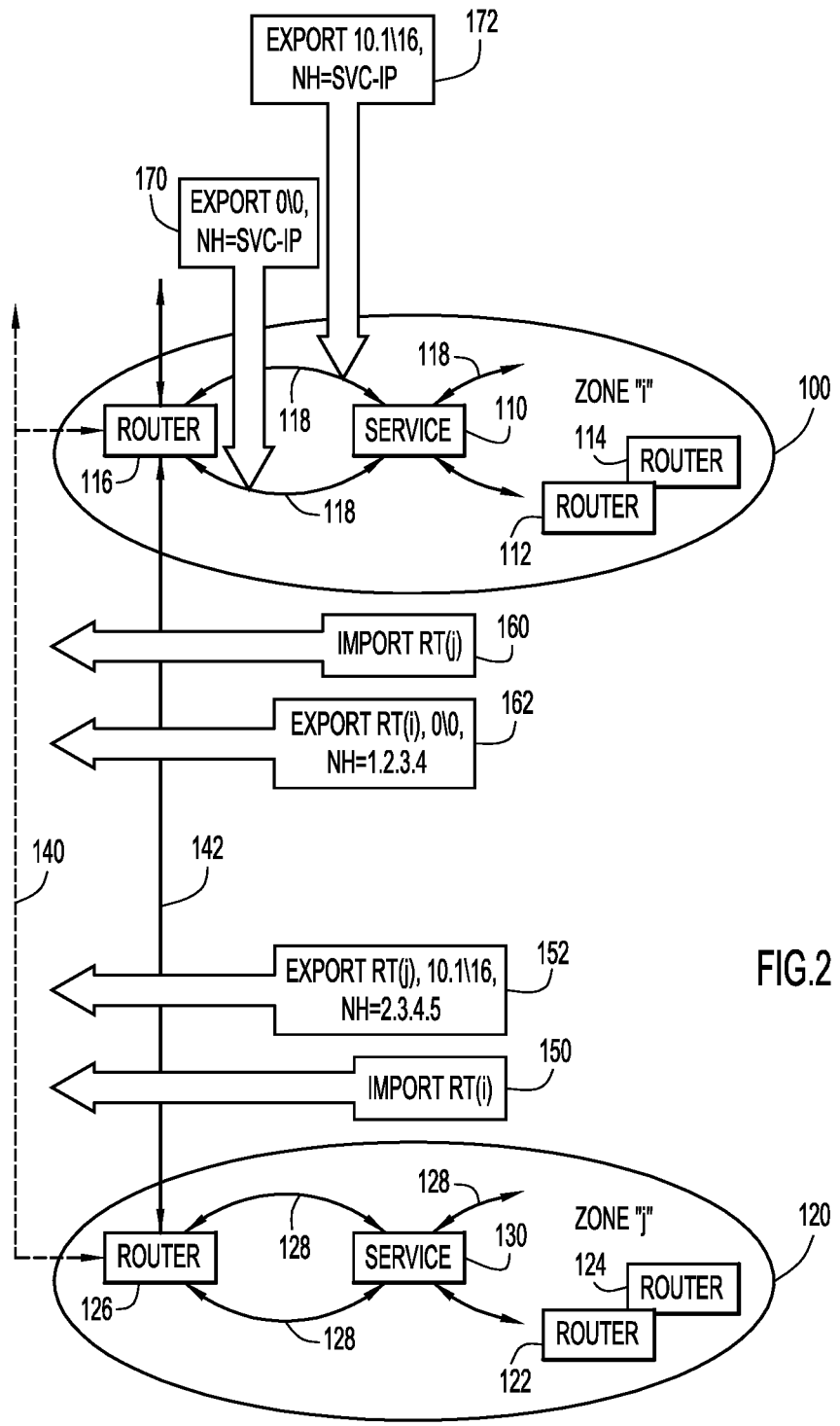
FIG. 2 is a block diagram of an example network environment comprising two service zones and illustrating techniques for creating a service chain by import/export rules at boundaries of the service zones.

Reference is now made to FIG. 2. FIG. 2 shows a configuration in which the service chain of length "1" shown in FIG. 1 is extended to a service chain of arbitrary length. FIG. 2 shows service zones 100 and 120, also denoted Zone "i" and Zone "j", respectively. A service zone is a logical construct, not a physical construct. Service zone i (100) includes an in-line application service 110 and service zone j (120) includes an in-line application service 130. For example, service 110 may be a firewall and service 130 may be a Hypertext Transport Protocol (HTTP) service, a Deep Packet Inspection (DPI) function, TCP optimizer, etc. Moreover, there may be multiple instances of the same service in each zone. For example, there may be multiple instances of the same service 110 in zone i (100) and multiple instances of the same service 130 in zone j (120). Further, these services 110 and 130 may be virtual machines running on an appliance in a data center. There may be hundreds of instances of the same service running in a given service zone.

As an example, there are a plurality of routers 112, 114 and 116 in zone i (100) and a plurality of routers 122, 124 and 126 in zone j (120). Routers in a given service zone connect to a service by way of attachment circuits shown at reference numerals 118 and 128 in service zones i (100) and j (120), respectively. The routers shown in FIG. 2 force traffic through a service (or service instance) in their respective service zones in much the same way as that described above in connection with FIG. 1. The edge routers 116 and 126 in service zones i (100) and j (120) communicate by way of various control protocols and data channels. For example, reference numeral 140 shows control protocol exchange by Multiprotocol BGP (MP-BGP) and reference numeral 142 shows data channel through MPLS tunnels. It is understood that there is a plurality of tunnels and signaling connections between the PE routers of the various zones. The edge routers 116 and 126 are also referred to herein as service zone edge routers. There may be multiple edge routers in a given service zone, but for simplicity only a single edge router is shown in a given service zone in this description.

The router 116 receives traffic from another service zone (logically above service 100 but not shown in FIG. 2 for simplicity), forces the traffic through the service 110 (or one of several instances of service 110), and then forwards the traffic, after processing by the service 110, along tunnel 142 to router 126 in service zone j (120). Similarly, router 126 in service zone j (120) receives the traffic from router 116 via tunnel 142, forces it to service 130 (or one of several instances of service 130), and then forwards the traffic on to another service zone or destination (not shown in FIG. 2). The same flow occurs in the opposite direct for inbound traffic to service zone j (120) to service zone i (100) and then onward to another service zone or destination.

Traffic from a router in one service zone may be routed to any of several routers in another service zone. For example, router 116 may elect to forward traffic through a data channel (not shown in FIG. 2 for simplicity) to router 122 in service zone j (120) rather than router 126, etc. Thus, state (adjacency information) is replicated appropriately between the routers within the service zone and between routers in different service zones, or a reconciliation protocol exist to resolve mappings.

Each service zone is assigned a route target. Again, a route target is assigned to a unique service zone to serve as a community value for route import and export between routers via a control protocol. A chain of services is created by appropriate import and export of destination network prefixes by way of route targets at edge routers of the service zones. Zone j (120) imports route targets from Zone i (100) and likewise, Zone i (100) imports route targets from Zone j (120) for the return/default path. Each of the routers shown in FIG. 2 is equipped with the appropriate service zone route targets and imports and exports the appropriate addresses. This involves receiving from a next service zone, a set of addresses, changing the service zone route targets to its own service zone export route target and re-originating those addresses for the previous service zone so that a chain is built up. All of the signaling necessary to achieve this may be performed by a control protocol, such as BGP or any other Internet Gateway Protocol. Advertisements between edge routers in service zones are sent in a direction opposite to traffic flow between service zones. For example, if traffic flows from a first service zone that is upstream from a second service zone, then route advertisements are sent from the edge router of the second service zone to the edge router of the first service zone.

A benefit of this architecture is that the service capacity in a given service zone may be variable, as well as the number of associated routers in a given service zone may be variable. In particular, if the routers are virtual PE routers, then new virtual PE routers may be added by starting up a virtual machine, populating that virtual machine with virtual PE functionality, provisioned with the appropriate service zone route target policies and notifying all of the peers that this router is now up and available for routing service.

For example, as shown in FIG. 2, at 162, router 116 in service zone i (100), advertises a default route to Zone j (120) so that routers in Zone j (120) know to send traffic through that default route for any traffic that is desired to be forwarded into Zone i (100). The advertisement 162 has the following information: RT(i), the address of router 116 (next hop) is 1.2.3.4, and it has a route to 0/0, the default route. Router 126 in Zone j (120) at 150, imports routes tagged with RT(i) from the router 116 in Zone i (100). Router 116, upon receiving traffic from Zone j (120), makes the decision as to which instance of the service 110 that Zone i (100) is going to use for that traffic.

Likewise, with respect to Zone j (120), the router 126, at 152, exports to router 116 in Zone i (100) the following information: RT(j), the address of router 126 (next hop) is 2.3.4.5 and it has a route to 10.1/16. Router 116 in Zone i (100) at 160, imports routes tagged with RT(j) from the router 126 in Zone j (120). In so doing routers in Zone i (100) know to send traffic through router 116 in Zone i (100) for any traffic desired to be forwarded into Zone j (120). Router 126, upon receiving traffic from Zone i (100), makes the decision as to which instance of the service 130 that Zone j (120) it is going to use for that traffic.

FIG. 2 also shows at Zone i (100) two additional items of information 170 and 172. These items correspond to Zone i (100) advertising to services how to get packets from and to the (virtual) PE, to the destination network or source network.

Figure 3A:
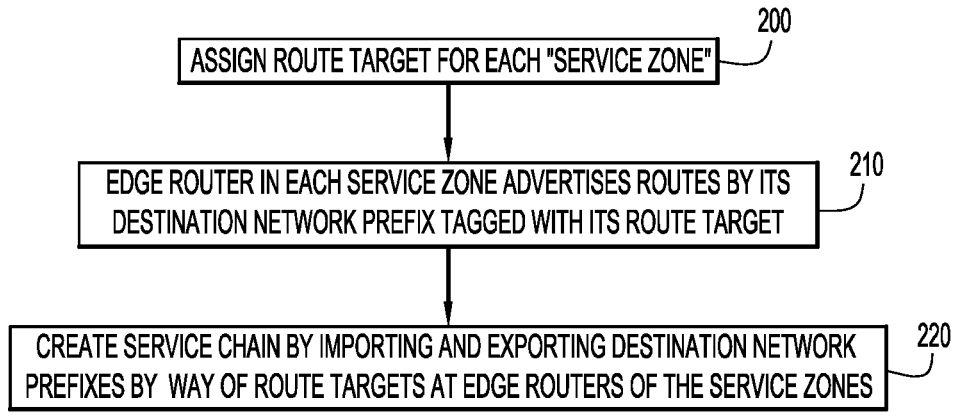
FIGS. 3A and 3B are flow charts depicting operations performed to create a service chain for a network environment such as that shown in FIG. 2.

Turning now to FIG. 3A, a flow chart is shown that depicts the basic operations performed for chaining service zones. At 200, a route target, RT, is assigned for each service zone. This assignment may be made at network management equipment. At 210, a virtual PE edge router, after learning a new route, in each service zone advertises routes by its destination network prefix tagged with its route target. At 220, a service chain is created chain by importing from destination networks or downstream service zones and exporting of destination network prefixes by way of route targets at virtual PE edge routers of the service zones to upstream service zones or source networks.

Figure 3B:
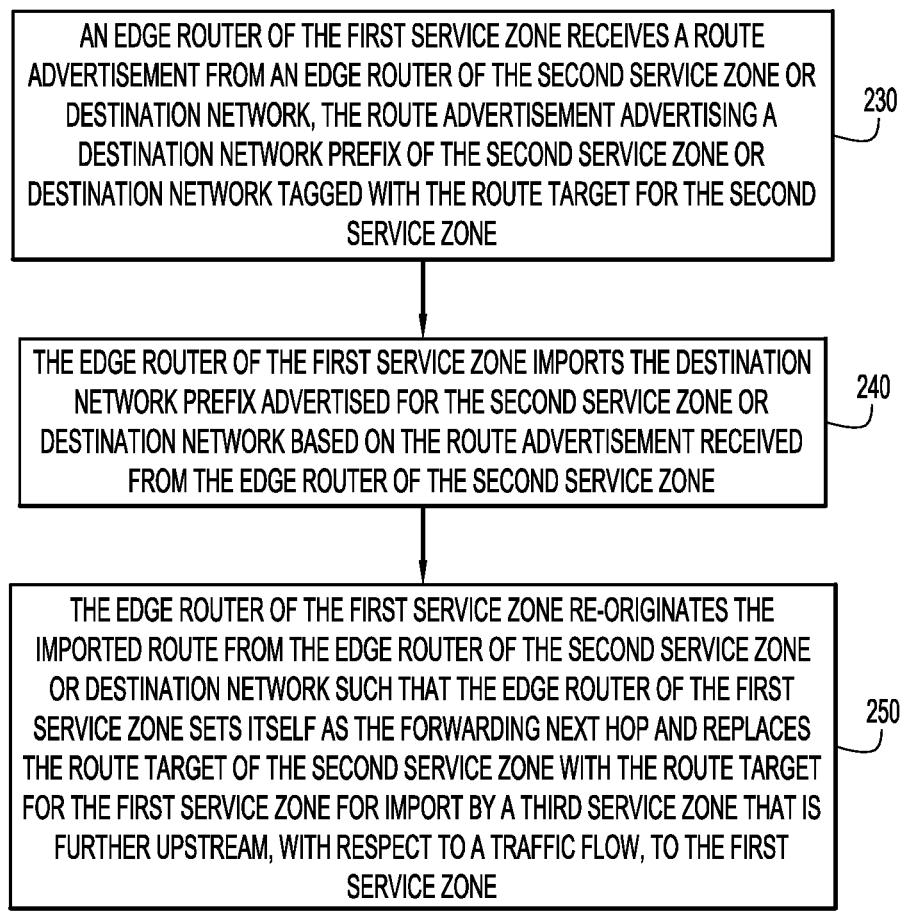

FIG. 3B is a flow chart that shows in more detail the operations performed by edge routers. In this paradigm, there is a first service zone or source network that is upstream, with respect to traffic flow, of a second service zone, and a third service zone that is upstream, with respect to traffic flow, of the first service zone. At 230, an edge router of the first service zone receives a route advertisement from an edge router of the second service zone or destination network, the route advertisement advertising a destination network prefix of the second service zone or destination network tagged with the route target for the second service zone (or destination network). At 240, the edge router of the first service zone imports the destination network prefix advertised for the second service zone or destination network based on the route advertisement received from the edge router of the second service zone or destination network.

At 250, the edge router of the first service zone re-originates the imported route from the edge router of the second service zone or destination network such that the edge router of the first service zone sets itself as the forwarding next hop and replaces the route target of the second service zone with the route target for the first service zone for import by a third service zone that is further upstream, with respect to a traffic flow, to the first service zone. The re-origination operation involves advertising to an edge router of the third service zone, or source network, a re-originated route advertisement learned from the edge router of the second service zone, the re-originated route advertisement including information indicating the destination network prefix of the second service zone, an address of the edge router for the first service zone as the forwarding next hop and the route target of the first service zone.

Again, it is worthy to note that re-origination is performed to attract traffic into the "head-end" of the service zone, i.e., the "service zone edge router." Other service zones have no idea of the internal service instance topology within a service zone, but rather know only of the service zone edge routers.

Figure 4:
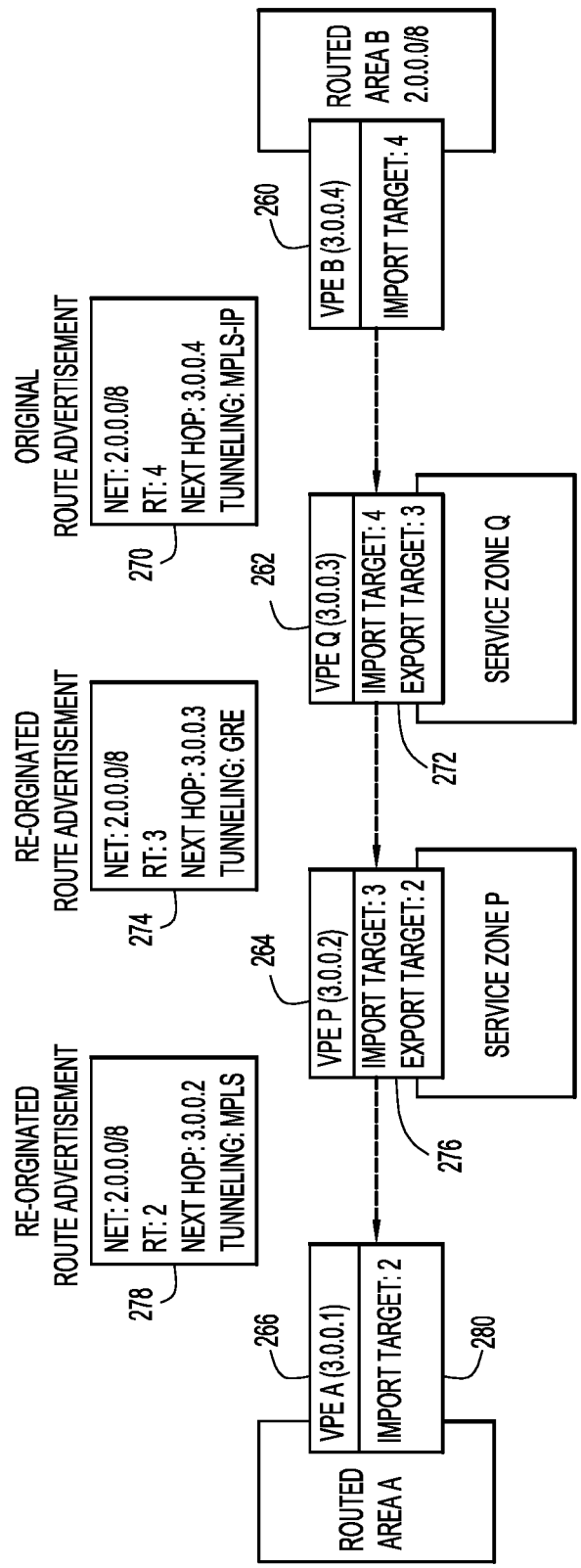
FIG. 4 is a diagram of network environment illustrating a further example of creating a service chain.

Consider the following example with reference to FIG. 4. In this example, there are two routed areas, Routed Area A and Routed Area B at 2.0.0.0/8. There are two service zones, Service Zone P and Service Zone Q. There are (virtual) PE routers, denoted "VPEs" for short in FIG. 4, on the edges of these service zones and routed areas. For example, (virtual) PE B at reference numeral 260 is in Routed Area B, (virtual) PE Q at 262 is in Service Zone Q, (virtual) PE P at 264 is in Service Zone P and VPE A at 266 is in Routed Area A.

The following flow is an example of service zone route target re-origination (also referred to as VRF installation) in the example configuration shown in FIG. 4. At 270, the original route advertisement for subnet 2.0.0.0/8 is sent from VPE B with export RT(4) and next hop 3.0.0.4. At 272, Service Zone Q imports routes at VPE Q using import RT(4). VPE Q therefore has 2.0.0.0/8 pointing to next hop (3.0.0.4) which is VPE B. At 274, VPE Q re-originates subnet 2.0.0.0/8 with itself as next hop (3.0.0.3) and appends RT(3). At 276, Service Zone P imports routes at VPE P using import RT(3). VPE P therefore has 2.0.0.0/8 pointing to next hop 3.0.0.3 which is VPE Q. At 278, VPE P re-originates subnet 2.0.0.0/8 with itself as next hop 3.0.0.2 and appends RT(2). At 280, VPE A imports routes using import RT(2). VPE A therefore has 2.0.0.0/8 pointing to next hop (3.0.0.2) which is VPE P. Thus, the example of FIG. 4 shows the chaining together of two service zones between two routed areas.

When a route is re-originated between service zones, the advertisement carries the preferred tunneling mechanism for the aggregate route in the advertisement. This tunneling mechanism can be a standard MPLS path, General Routing Encapsulation (GRE), MPLSoIP/GRE, Virtual Extensible LAN (VXLAN) or any other tunneling mechanism. While no specific tunneling mechanism is mandated, the tunnel needs to carry in its header an identifier referring to the next hop's VRF (e.g. a MPLS label or other identifier). Inter-service zone routing is by way of aggregate routes to control the amount of signaling. The amount of signaling should be close to none if the configuration is stable, i.e., if there are no routing reconfigurations. While aggregate routes are distributed, these aggregates can optionally additionally carry protocol-specific parameters for directing certain streams. An example of this is that a service zone may advertise <proto=TCP port=80> to attract all HTTP traffic into a service zone. A tunnel can carry session-specific information to the benefit of subsequent service zones. Moreover, in exceptional cases the service instance itself may be integrated with the (virtual) PE to enable the service instance to learn of these extra parameters, or alternatively, the (virtual) PE maintains a tunnel as an attachment circuit to the service instance to carry the extra parameters.

Traffic routing is based on simple aggregate destination prefix route advertisements. Yet, exceptionally, aggregate source-based routing can be considered as well, albeit this would involve (MP-)BGP standards changes.

Reconfigurations of the chain can be performed dynamically, although care needs to be taken to avoid creating cycles in a chain. Consider the example of routed area X and service zones P and Q connecting to the Internet. To insert service R between P and Q, first VRFs in R need to import routes tagged with RT(P) before routers in service zone Q can import routes tagged with RT(R) and routers in service zone P can import routes tagged with RT(R'). Finally, routers in service zone Q can then stop importing and actively discarding routes tagged with RT(P) while routers in service zone P can stop importing and actively discarding routes tagged with RT(Q). For removing a service zone R, first routes between service zone P and service zone Q need to be established before routes through service zone R can be discarded. This is horizontal scaling of the service chain. A similar technique is used for inserting default routes.

While the chaining mechanism is described herein in connection with the use of RFC 4364 signaling, alternate forms of signaling can be used as well. As an example, an external controller can download aggregate routes into each of the (virtual) PE's VRFs by way of an external interface.

Figure 8:
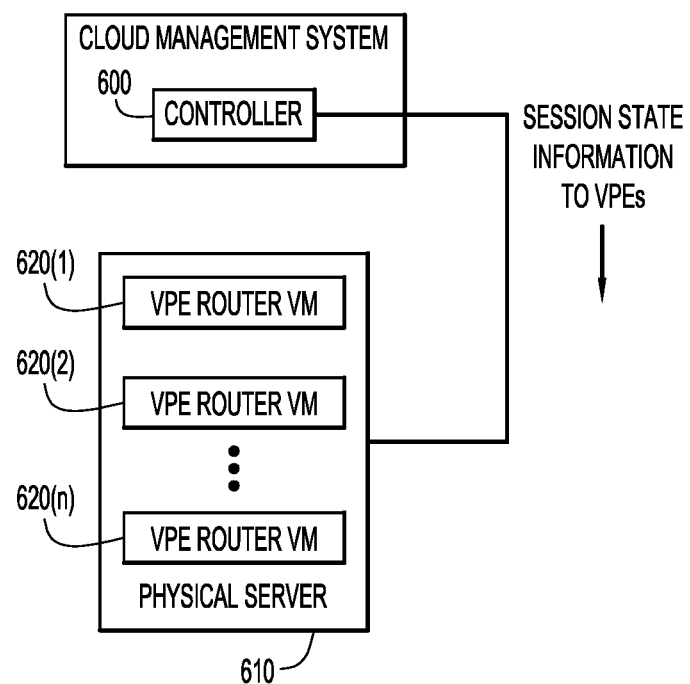
FIG. 8 is a block diagram illustrating a centralized controller to provision service zone edge routers with session state information according to the techniques presented herein.

(Virtual) PEs can be created and dismissed dynamically. While regular routing techniques can be used to distribute aggregate routes through a service area, such as distribution of aggregate routes to previous hops, a (virtual) PE needs to be provisioned with the appropriate (route target) parameters to make this happen. Each of the (virtual) PEs can cater to an external interface that allows a central controller to provision the (virtual) PE. This central controller is configured for dynamic instantiation of VRFs in the newly created (virtual) PE, installation of the appropriate export and import route targets associated with that VRF, other configuration parameters to enable the (virtual) PE to communicate with other (virtual) PEs. Similarly, the central controller removes the (virtual) PE from the routed infrastructure. Cloud management systems can address the actual instantiation of the appropriate virtual machines that carry the virtual PEs and the establishment of attachment circuits. FIG. 8, described hereinafter, shows an example of a central controller in provisioning and re-configuring VPEs.

Session Routing—Service Routing and Forwarding (SRF)

Routing and signaling within a service zone is based on session routing. While inter-zonal communication is based on VRFs, routing and signaling within a service zone is based on "service routing and forwarding" (SRF). For intra-service routing, it is important to list per session which particular virtual appliance using which particular address is serving a particular session. The reason this is important is that oftentimes a service instance allocates "state" to maintain the service. If packets are not guaranteed to be delivered at the same service instance, usually no service can be offered.

To communicate with service instances, one or more (virtual) PEs/VRFs in a service zone maintains one or more attachment circuits to one or more service instances. These attachment circuits can be based on VLAN technology, hypervisor kernel tunnels (e.g. tunctl(8)), virtual Ethernet (e.g. SR-IOV) switching functionality, or other attachment connection types. In case hypervisor based kernel tunnels are used, a hypervisor kernel co-resident virtual PE terminates the attachment tunnels to the service instance. In this case, all packets destined to that service need to be routed first to the co-resident (virtual) PE before packets can be delivered to the appropriate service instance.

Figure 5:
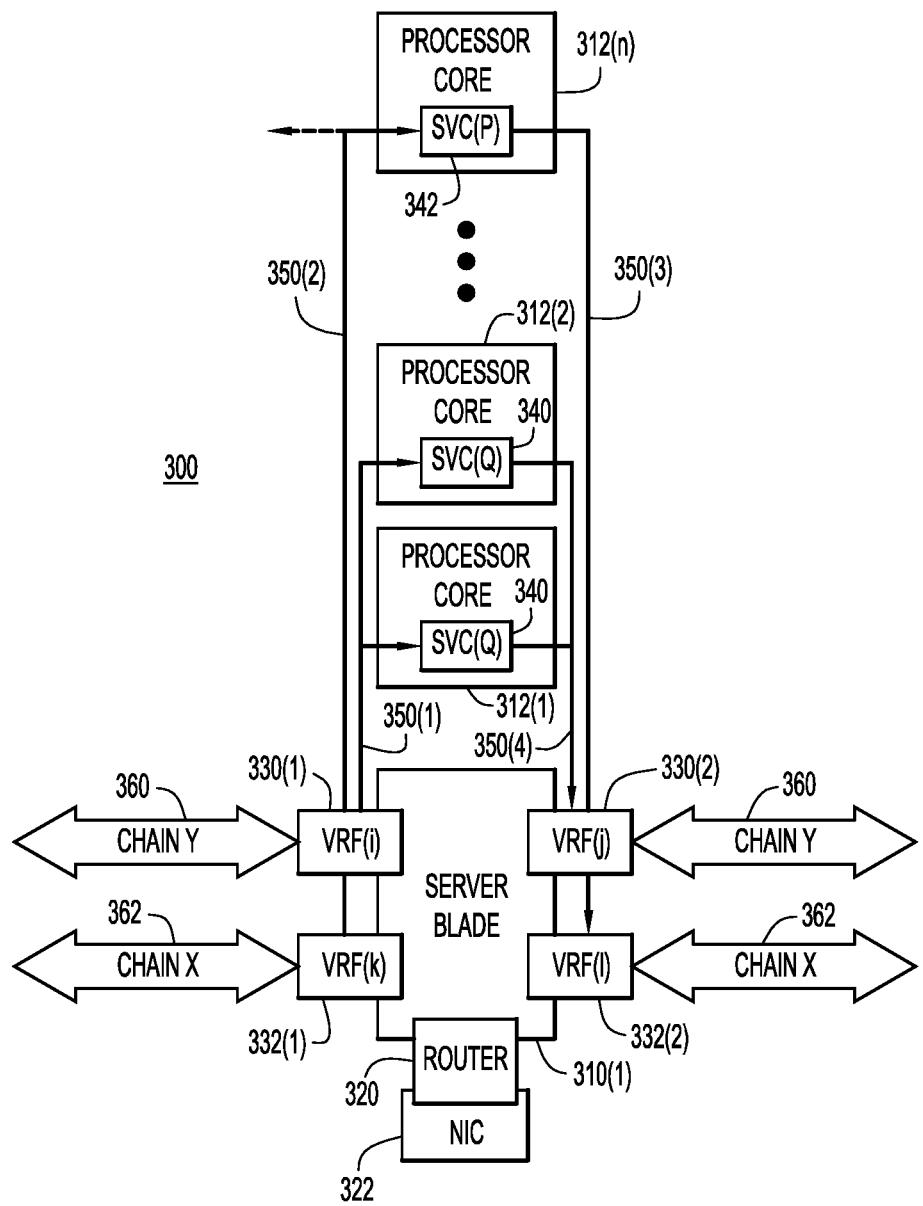
FIG. 5 is a block diagram showing session routing and forwarding performed within a service zone to manage traffic forwarding among multiple service instances.

Turning now to FIG. 5, a description is presented of how attachment circuits operate in service zone. Reference numeral 300 is a service zone, and the elements shown in FIG. 5 are elements of the service zone that may be implemented in a data center. The data center includes a plurality of server blades each having one or more processor cores and capable of running multiple virtual machines. A virtual router 320 runs in a virtual machine on server blade 310 and operates a network interface card (NIC) 322. The virtual router 320 is equivalent to the aforementioned service zone edge router referred to in connection with FIG. 2. The server blade 310(1) also stores data structures for each of a plurality of VRFs, for example, VRF 330(1) and 330(2), and VRFs 332(1) and 332(2), labeled as VRF(i), VRF(j), VRF(k) and VRF(l), respectively. There are individual processor cores 312(1)-312(n) in the data center that each runs a service in a virtual machine. There may be a service running per processor core. For example, processor core 312(1) runs service 340 (also called SVC(Q)), processor core 312(2) runs another instance of the same service 340, and processor core 312(n) runs service 342 (also called SVC(P)).

There are a plurality of attachment circuits connected between the services 340 and 342 and the VRFs. For example, attachment circuit 350(1) connects traffic from VRF(i) to SVC(Q) in processor cores 312(1) and 312(2). Attachment circuit 350(2) connects traffic from VRF(k) to SVC(P) in processor core 312(n). Attachment circuit 350(3) connects traffic (after processing by SVC(P)) from SVC(P) to VRF(l) and attachment circuit 350(4) connects traffic (after processing by SVC(Q)) from SVC(Q) in processor cores 312(1) and 312(2) to VRF(j). The server blade 310(1) stores a data structure for each of the VRFs. Each VRF contains information as to how to switch a packet into a service. Moreover, the VRFs 330(1) and 330(2) are companion VRFs with respect to traffic flow in either direction through the service zone and likewise the VRFs 332(1) and 332(2) are companion VRFs.

It is to be understood that FIG. 5 shows a single service zone, but any given service zone may be part of a chain of other service zones. Accordingly, FIG. 5 shows arrows 360 and 362 to indicate traffic through the service zone 300 associated with two different service chains, denoted Chain X and Chain Y respectively.

The virtual router 320 will receive, from a third party, over a tunnel (e.g., an MPLS tunnel) an IP packet encapsulated with a header. Inside the header is a label that refers to a particular VRF in the VRF data structure stored in the server blade 310(1). For example, consider a packet that arrives into the data center, via virtual router 320, associated with service Chain Y into VRF 330(1). The VRF 330(1) inspects the IP address of the packet and forwards the packet to the appropriate service, e.g., SVC(Q). Information is stored to indicate which of the SVC(Q) instances (on processor core 312(1) or on processor core 312(2)) is serving the IP address for that packet. VRF 330(2) receives the packet after it has been processed by SVC(Q) and forwards it out the service zone as appropriate. VRFs 332(1) and 332(2) operate in a similar manner for traffic on Chain X.

As VRF 330(2) learns over Chain Y that it has reachability to a particular downstream network, two things can happen. First, the VRF 330(2) leaks that information to its companion VRF 330(1) which can then re-originate that network address. Second, within each of the SRFs, state is maintained as to how to route individual traffic flows, bi-directionally for the service chains. More generally information is stored indicating which service each SRF should forward traffic to based on the particular packet flow of traffic (e.g., IP address of the traffic session). This operation is referred to as session routing within a service zone.

Figure 6:
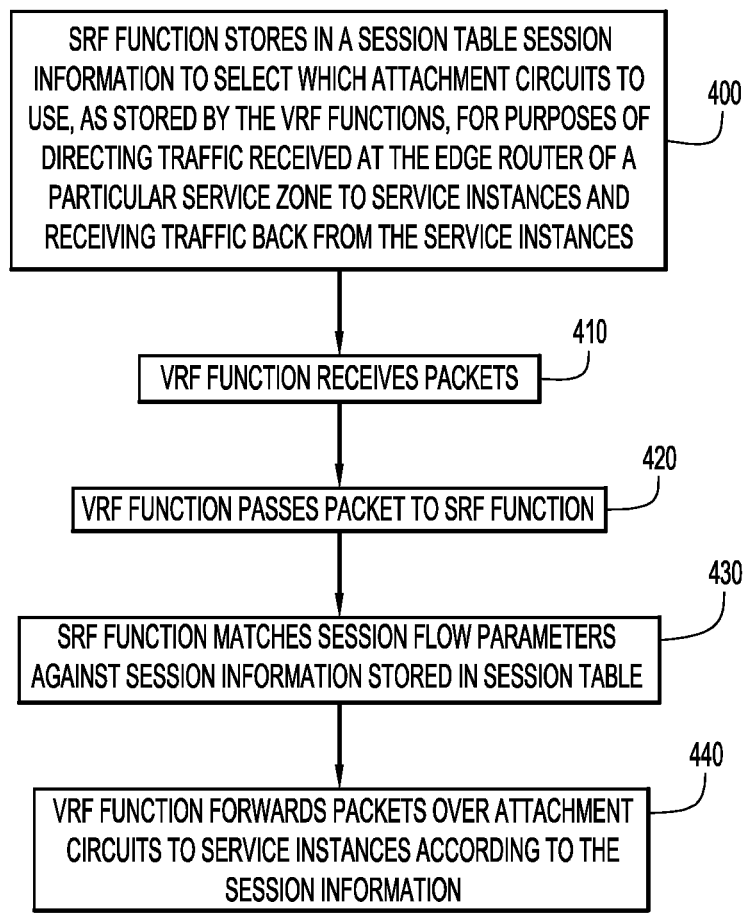
FIG. 6 is a flow chart depicting operations performed for the session routing and forwarding function.

Turning now to FIG. 6, a flow chart is shown that depicts the operation of the SRF function and the VRF functions in a service zone. As described above in connection with FIG. 5, a plurality of VRF functions are provided in the (virtual) PE edge router at which traffic is received in a particular service zone and a plurality of attachment circuits are connected between VRF functions and service instances. Each VRF function stores data maintaining a corresponding one of the attachment circuits for traffic flow to and from a corresponding service instance. At 400, the SRF function stores in a session table session information and in combination with the associated VRF which attachment circuits to use, as stored by the VRF data structures, for purposes of directing traffic received at the (virtual) PE edge router of the particular service zone to service instances and receiving traffic back from the service instances. The session information represents assignment of packet sessions to attachment circuits for delivery to service instances according to session flow parameters of the packets. At 410, a VRF function of an (virtual) PE edge router of the particular service zone receives packets. At 420, the VRF function resolves attachment circuit forwarding information through the packets and the SRF function. At 430, the SRF function matches session flow parameters, e.g., the 5-tuple of the packets against session information stored in the session table, and passes the packets packet to the VRF function with appropriate session information. At 440, the VRF function forwards the packets over attachment circuits to service instances according to the session information.

To summarize the operations of the flow chart of FIG. 6 and the arrangement of FIG. 5, traffic is received at an edge router in a particular service zone. The traffic is directed to a service instance in the particular service zone. The traffic is received back from the service instance in the particular service zone and forwarded on from the particular service zone. As shown in FIG. 5, a service zone may comprise a plurality of service instances, and in which case it is necessary to determine which of the plurality of service instances to direct the traffic to in the particular service zone. The operations of FIG. 6 described above set forth the mechanism for determining how traffic is directed to service instances within a service zone.

As an example, an HTTP service zone can have many individual virtual HTTP service instances, and the forwarding of the individual sessions to the appropriate HTTP service instance is managed through the VPE/VRF/SRF tables operating in the service zone. If a virtual machine X hosts an HTTP proxy for mobile node 2.0.0.1, and is reachable over VLAN 12 with IP address 10.0.1.2, the SRF function in the (virtual) PE would list a route with "source=2.0.0.1/32 proto=TCP port=80" referring to "vmaddr=10.0.1.2" at "circuit=VLAN:12" for traffic originating from a mobile node. Similarly, return traffic matches in the VRF on the destination address. If the HTTP service can only be reached by a VPE at address 192.168.10.4 over tunnel 8, the routing entry additionally carries a "circuit=192.168.10.4" clause. If a firewall service is to be applied in series with the HTTP service, the HTTP VRF would maintain a default route to the firewall VRF, e.g. <dest=0/0 next-hop=FW(A) next-hop=FW(B)> in case there exist multiple VPEs in the firewall service.

Figure 7:
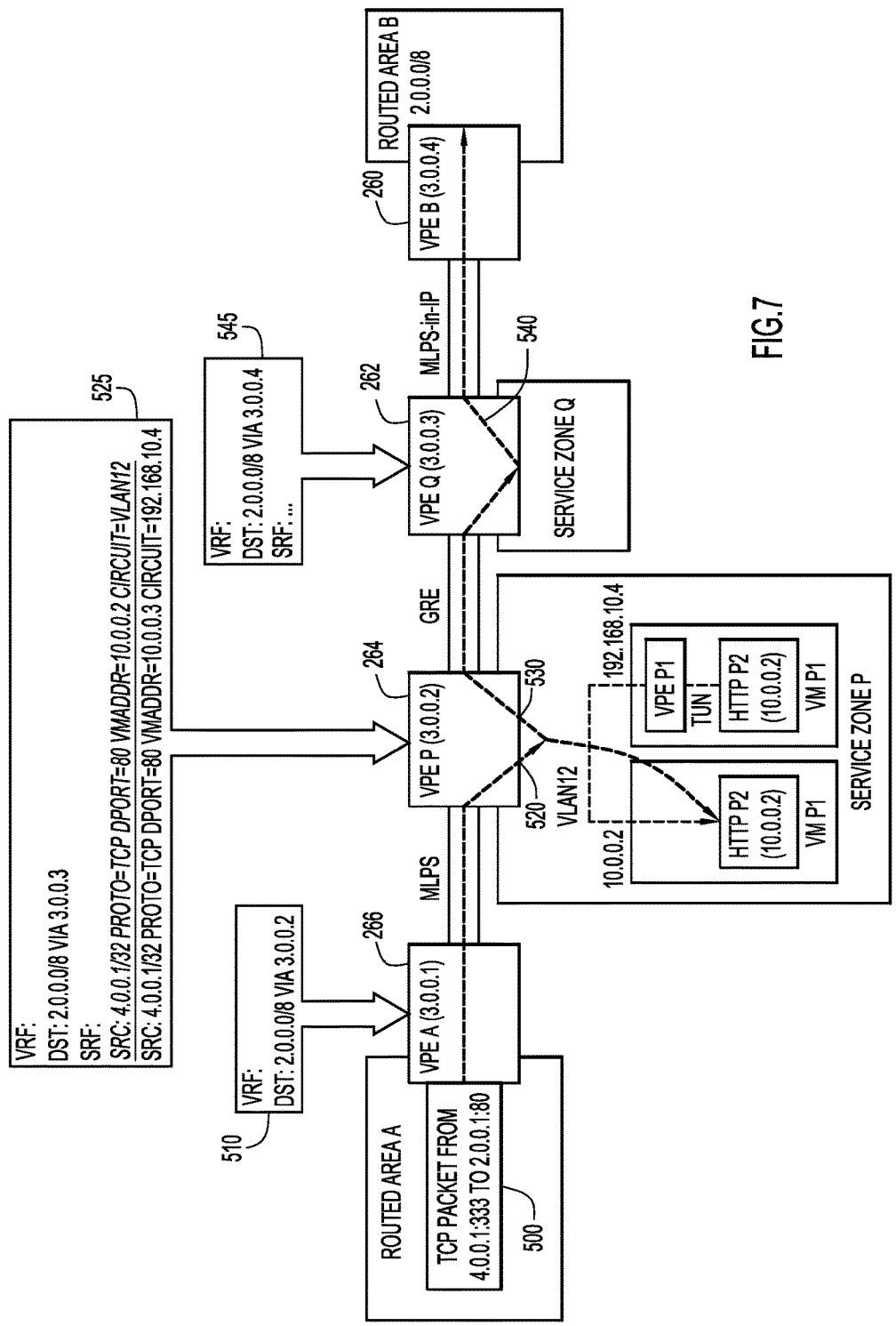
FIG. 7 is a block diagram illustrating an example of operation of the session routing and forwarding function.

Referring to FIG. 7, an example of the SRF and VRF functions are described. FIG. 7 is similar to FIG. 4 in that it has Service Zones P and Q and Routed Areas A and B. VPEs 260-266 are provided as described above in connection with FIG. 4. At 500, a TCP packet from source 4.0.0.1:333 destined to 2.0.0.1 port 80 is received at VPE A. At 510, inbound VRF at VPE A has a forwarding entry for 2.0.0.0/8 referring to next hop 3.0.0.2 which is VPE P. The packet is forwarded to VPE P. At 520, VPE P uses the SRF function and information in the session information table 525 to forward the packet. An entry in the session information table 525 is found matching source 4.0.0.1, destination port 80, which refers to VM address 10.0.0.2 that is reachable via attachment circuit VLAN12. The packet is forwarded to VM with address 10.0.0.2 which is VM (P1). At 530, the return packet from VM (P1) is forwarded by VPE P based on lookup in VRF function at VPE P. VPE P determines that destination 2.0.0.0/8 is reachable via next hop (3.0.0.3) which is VPE Q. At 540, the inbound packet at VPE Q is forwarded based on VRF function entry at 545 for destination 2.0.0.0/8 which is next hop (3.0.0.4) which is VPE B.

SRF state needs to be distributed in the service zone to ensure all SRF functions can route packets to the appropriate service instances. There are many methods to realize this kind of distribution and this disclosure does not dictate any particular form of service-zone session state management. In fact, one can even envision different kinds of SRF state management systems in a single system. The following are options for SRF session-state information distribution.

First, one mechanism to distribute session-state is to use an external controller that installs service routes in all of the VPEs/SRFs as soon as a new service flow is admitted in a service zone. On receipt of a first packet in a session, the SRF informs the central controller of the new session, the controller makes a service instance placement decision and informs all SRFs of the routing decision. To this end, reference is made to FIG. 8 which shows a controller 600 connected to a physical server 610 in a data center. The physical server 610 may have any number of processing cores running virtual machines, including virtual machines for a plurality of VPEs as shown at reference numerals 620(1)-520(n). The controller 600 may be a physical server or software process on a server that is part of a cloud management system. The controller 600 sends to the VPE VMs 520(1)-520(n) configuration messages including session state information. In addition, the controller 600 may perform the aforementioned functions for creating and dismissing virtual PEs, i.e., dynamic instantiation of VRFs in the newly created (virtual) PE, installation of the appropriate export and import route targets associated with that VRF, other configuration parameters to enable the (virtual) PE to communicate with other (virtual) PEs.

In terms of "session keys" used in the session-routing state, it is envisioned that any the aforementioned 5-typle or any part of a packet's IP packet header can be used as a session key. In cases where source routing is used, only a source address of an IP packet helps direct packet flows. In other cases, more header fields can be used including, but not limited to, protocol types, protocol numbers and destination address ranges (e.g. to route all traffic from 2.1.0/24 to http://cnn.com to a particular service chain). In case the service system is used in a mobile environment, the 3GPP General Packet Radio Service (GPRS) tunneling protocol's (GTP) tunnel identifier (TED) may be used as (part of) a session key, or in case session routing is to be defined for IEEE WiMAX, 3GPP2's CDMA2000/EvDO or cable CAPWAP systems, the generic routing encapsulation (GRE) key may be used as part of the session-routing key.

In an alternate form, route installation proceeds more "lazily." When a first packet arrives for a service instance, in a SRF function, the SRF function matches the session key to the listed session and if it fails to find session routing information, the SRF function requests the installation of a route associated with the session key. If the controller deems the packet to be part of a new session, the controller selects a service instance to host the session, and informs the calling SRF function of the session mapping. If the packet is part of an already existing session, the controller informs the calling SRF function which SRF function is serving the session.

In still another form, the SRF functions are operated as a distributed service. All SRFs participating in the service zone may execute a state distribution protocol to inform other participants of local session routing decisions. As an example, if a service instance receives an incoming first packet of a session, it may unilaterally decide which service instance hosts the session, including itself. It then distributes this decision to all or part of the other participants in the service zone by way of, e.g., reliable multicast or piggy-backing this information on existing routing protocols such as MP-BGP. In a variation to this, before making a local decision, a (virtual) PE may solicit mapping information first from other participants in the service zone and if no other (virtual) PE supports the mapping, the (virtual) PE may proceed in making a local session routing decision. The decision as to if and what state to distribute to other participants is based on the service zone's session-state reliability requirements. In some cases, losing session-routing state is not an issue and no redundancy may be needed. In other cases, it is vital that all SRF functions are completely synchronized, requiring different state consistency protocols.

Still another possibility is, if need be, service zone session routing state can be kept in a distributed hash table (DHT), where a "primary" SRF function installs routes, and if needed, "secondary" SRF functions can load session-routing state.

Yet another possibility is to completely statically establish a session routing infrastructure to avoid any session-state consistency protocol.

A simple time-out mechanism may be used to clear SRF entries.

Each service zone can dynamically adjust its routing, forwarding and service capacity by instantiation of new service instances and virtual PE routers with associated VRF functions and SRF functions. In at least one form of a virtual PE, regular routing techniques are used to signal adjacency with respect to its VRF function. When a new virtual PE/VRF is provisioned with the appropriate route targets, it becomes part of the routing infrastructure. It learns of next hops by way of importing the appropriate route targets of next hops, and re-originates those learned routes to previous hops. Session-routing state in the SRF functions is learned by an external controller downloading all session routes into the new instance, or by using distributed reconciliation procedures. Similarly, to reduce capacity, a virtual PE is simply removed from the set. Again, VRF adjacency state is automatically adjusted, and since SRF state is consistent within the zone, the SRF can be simply discarded. If a service instance itself is discarded, all sessions pointing to the service instance are discarded as well.

The aforementioned external interface to a (virtual) PE can be used to instruct a (virtual) PE how to manage the SRF functions in a service zone. Parameters that can be installed on the (virtual) PEs are the methods by which SRF functions in the service zone maintain consistency, including establishing parameters reflective of MP-BGP parameters, DHT information, multicast tree information or any other parameter needed for this consistency management.

In case application-specific parameters may be gleaned from a traffic flow, and there is application-specific functionality available in a (virtual) PE, application-specific parameters may be used for session-routing purposes. This may include HTTP parameters. The data structures associated with maintaining session keys are application specific.

Figure 9:
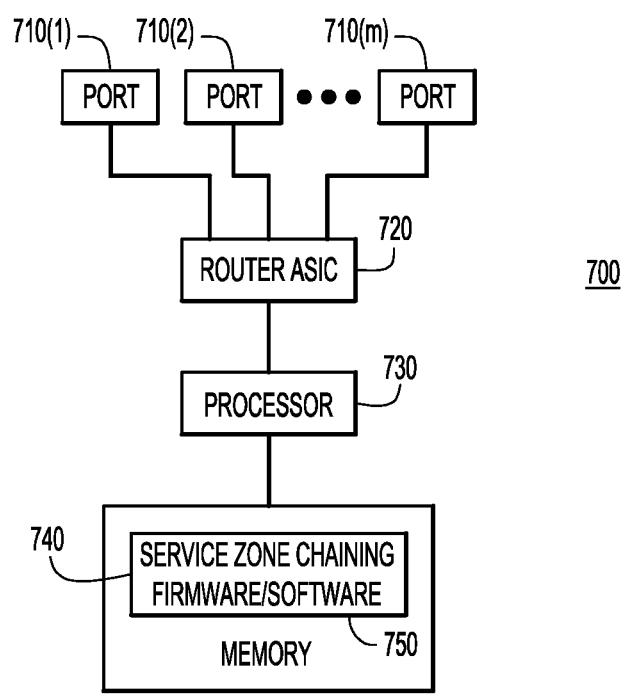
FIG. 9 is an example block diagram of a router configured to perform the techniques presented herein.

Turning now to FIG. 9, an example block diagram is shown for a router configured to perform the operations described herein for an edge router, e.g., (virtual) PE router. It should be understood that a virtual PE would be a software-emulated or virtualized version of what is shown in FIG. 9. The PE router, shown at reference numeral 700, comprises a plurality of ports 710(1)-710(m), a router Application Specific Integrated Circuit (ASIC) 620, a processor or central processing unit (CPU) 730 and memory 740. The ports 710(1)-710(m) receive ingress packets and output egress packets from the router. The router ASIC 720 directs incoming packets to ports for egress according to routing logic as well as controls from the processor 730. The processor 730 is a microprocessor or microcontroller, for example, and executes instructions for the service zone chaining firmware/software 750 stored in memory 740. The service zone chaining firmware/software 750 includes instructions that, when executed by the processor 730, cause the processor to perform the operations described herein in connection with FIGS. 1-8 for a PE router.

The memory 740 may comprise read only memory (ROM), random access memory (RAM), magnetic disk storage media devices, optical storage media devices, flash memory devices, electrical, optical, or other physical/tangible memory storage devices. In general, the memory 740 may comprise one or more tangible (non-transitory) computer readable storage media (e.g., a memory device) encoded with software comprising computer executable instructions and when the software is executed (by the processor 740 it is operable to perform the operations described herein.

In summary, techniques are presented herein to manage service chaining by way of chaining service zones, and session routing within service zones. A mechanism by which a signaling protocol can chain zones is presented herein, and how these chains can dynamically be altered, and mechanisms are presented herein by which individual session routing information is distributed within a service zone.

One advantage of service chaining by extending the extranet technique is that the basic chaining and adjacency signaling functionality is already available in existing routers; yet it is not used for general service chaining procedures. These techniques build on the extranet service by introducing horizontal and vertical scaling of services, managing per-session state in SRF functions, and by connecting SRF functions to VRFs. Any of a number of different control protocols may be used to manage routes in the set of VRF functions and SRF functions. By embedding session management within the (virtual) PE, services can be introduced in a service chain without changes.

The above description is intended by way of example only.

What is claimed is:
1. A method comprising;
providing in a network environment a plurality of service zones, each service zone including a plurality of instances of an in-line application service to be applied to network traffic and one or more edge routers to direct network traffic to one or more application services;
assigning a route target to each service zone to serve as a community value for route import and export between routers of other service zones, destination networks or source networks;
advertising, by an edge router in each service zone or destination network, routes by destination network prefix tagged with its route target;

at an edge router of a first service zone, generating a re-originated route advertisement for import by a third service zone that is further upstream, with respect to a traffic flow, to the first service zone, the re-originated route advertisement being generated by re-originating an imported route from a second service zone or destination network such that the edge router of the first service zone sets itself as the forwarding next hop, replaces the route target of the second service zone with the route target for the first service zone and inserts the first service zone between the third service zone and the second service zone or destination network for the traffic flow;

creating a service chain by importing and exporting, via a routing control protocol, destination network prefixes by way of route targets at edge routers of the service zones or source networks;

providing a plurality of virtual routing and forwarding (VRF) functions in the edge router at which traffic is received in a particular service zone and a plurality of attachment circuits connected between VRF functions and service instances, each VRF function storing data maintaining a corresponding one of the attachment circuits for traffic flow to and from a corresponding service instance;

providing a session routing and forwarding (SRF) function that stores session information to select which attachment circuits to use, as stored by the VRF functions, for purposes of directing traffic received at the edge router of the particular service zone to service instances and receiving traffic back from the service instances, the session information representing assignment of packet sessions to attachment circuits for delivery to service instances according to session flow parameters of the packets; and after creation of the service chain, performing operations including:
 receiving traffic at an edge router in the particular service zone;
 directing the traffic to a service instance in the particular service zone;
 receiving traffic back from the service instance in the particular service zone;
 forwarding the traffic on from the particular service zone; and
 determining which of the plurality of service instances to direct the traffic to in the particular service zone.

2. The method of claim 1, further comprising:
horizontally scaling a given service chain by dynamically inserting and/or removing one or more service instances in the given service chain;
vertically scaling the given service chain by dynamically increasing and/or reducing a capacity of one or more service instances in the given service chain according to demand changes for the one or more service instances; and
within the particular service zone, dynamically adjusting routing, forwarding and service capacity by adding and/or removing on or more VRF functions and associated SRF functions based on the horizontally scaling and the vertically scaling.

3. The method of claim 1, wherein creating a service chain comprises:
receiving at the edge router of the first service zone a route advertisement from an edge router of the second service zone or destination network, the route advertisement advertising a destination network prefix of the second service zone or destination network tagged with the route target for the second service zone; and
at the edge router of the first service zone, importing the destination network prefix advertised for the second service zone or destination network based on the route advertisement received from the edge router of the second service zone.

4. The method of claim 1, further comprising:
advertising to an edge router of the third service zone or source network, the re-originated route advertisement learned from the edge router of the second service zone, the re-originated route advertisement including information indicating the destination network prefix of the second service zone, an address of the edge router for the first service zone as the forwarding next hop and the route target of the first service zone.

5. The method of claim 1, wherein the edge routers of the service zones are physical routers or virtual routers.

6. The method of claim 1, wherein receiving traffic comprises receiving packets at a VRF function of the edge router of the particular service zone, wherein directing comprises:
passing the packets to the SRF function in the particular service zone function;
the SRF function matching session flow parameters of the packets against the session information; and
passing the packets back to the VRF function with appropriate session information; and the VRF function forwarding packets over attachment circuits to service instances according to the session information.

7. An apparatus comprising:
a plurality of ports configured to receive packets from and to send output packets to a network;
a router unit coupled to the plurality of ports and configured make decisions as to how to route received packets to ports for output to the network;
a processor coupled to the router unit, wherein the processor is configured to:
 define a plurality of service zones, each service zone including a plurality instances of an in-line application service to be applied to network traffic and one or more edge routers to direct network traffic to one or more application services;
 assign a route target to each service zone to serve as a community value for route import and export between routers of other service zones, destination networks or source networks;
 advertise routes by destination network prefix tagged with its route target;
 for a first service zone, generate a re-originated route advertisement for import by a third service zone that is further upstream, with respect to a traffic flow, to the first service zone, the re-originated route advertisement being generated by re-originating an imported route from a second service zone or destination network such that the edge router of the first service zone sets itself as the forwarding next hop, replaces the route target of the second service zone with the route target for the first service zone and inserts the first service zone between the third service zone and the second service zone or destination network for the traffic flow;
 create a service chain by importing and exporting, via a routing control protocol, destination network prefixes by way of route targets at edge routers of the service zones or source networks;

execute a plurality of virtual routing and forwarding (VRF) functions in the edge router at which traffic is received in a particular service zone and a plurality of attachment circuits connected between VRF functions and service instances, each VRF function storing data maintaining a corresponding one of the attachment circuits for traffic flow to and from a corresponding service instance;

execute a session routing and forwarding (SRF) function that stores session information to select which attachment circuits to use, as stored by the VRF functions, for purposes of directing traffic received at the edge router of the particular service zone to service instances and receiving traffic back from the service instances, the session information representing assiqnment of packet sessions to attachment circuits for delivery to service instances according to session flow parameters of the packets; and after creation of the service chain, perform operations including:
receiving traffic at an edge router in the particular service zone;
directinq the traffic to a service instance in the particular service zone:
receiving traffic back from the service instance in the particular service zone;
forwarding the traffic on from the particular service zone; and
determining which of the plurality of service instances to direct the traffic to in the particular service zone.

8. The apparatus of claim 7, wherein the processor is further configured to:
horizontally scale a given service chain by dynamically inserting and/or removing one or more service instances in the given service chain;
vertically scale the given service chain by dynamically increasing and/or reducing a capacity of one or more service instances in the given service chain according to demand changes for the one or more service instances; and
within the particular service zone, dynamically adjust routing, forwarding and service capacity by adding and/or removing on or more VRF functions and associated SRF functions based on the horizontally scaling and the vertically scaling.

9. The apparatus of claim 7, wherein the processor creates a service chain by:
receiving at the edge router of the first service zone a route advertisement from an edge router of the second service zone or destination network, the route advertisement advertising a destination network prefix of the second service zone or destination network tagged with the route target for the second service zone; and
at the edge router of the first service zone, importing the destination network prefix advertised for the second service zone or destination network based on the route advertisement received from the edge router of the second service zone.

10. The apparatus of claim 7, wherein the processor is configured to:
advertise to an edge router of the third service zone or source network, the re-originated route advertisement learned from the edge router of the second service zone, the re-originated route advertisement including information indicating the destination network prefix of the second service zone, an address of the edge router for the first service zone as the forwarding next hop and the route target of the first service zone.

11. The apparatus of claim 7, wherein the processor is configured to receive traffic by receiving packets receiving traffic comprises receiving packets at a VRF function of the edge router of the particular service zone, wherein directing comprises:
passing the packets to the SRF function in the particular service zone function;
the SRF function matching session flow parameters of the packets against the session information; and
passing the packets back to the VRF function with appropriate session information; and the VRF function forwarding packets over attachment circuits to service instances according to the session information.

12. The apparatus of claim 7, wherein the edge routers of the service zones are physical routers or virtual routers.

13. A system comprising:
a plurality of service zones, each service zone including a plurality of instances of an in-line application service to be applied to network traffic and one or more edge routers to direct network traffic to one or more application services, a route target being assigned to each service zone to serve as a community value for route import and export between routers of other service zones, destination networks or source networks;
an edge router in each service zone or destination network configured to advertise routes by destination network prefix tagged with its route target;
an edge router of a first service zone configured to generate a re-originated route advertisement for import by a third service zone that is further upstream, with respect to a traffic flow, to the first service zone, the re-originated route advertisement being generated by re-originating an imported route from a second service zone or destination network such that the edge router of the first service zone sets itself as the forwarding next hop, replaces the route target of the second service zone with the route target for the first service zone and inserts the first service zone between the third service zone and the second service zone or destination network for the traffic flow;
wherein a service chain is created by importing and exporting, via a routing control protocol, destination network prefixes by way of route targets at edge routers of the service zones or source networks;
a plurality of virtual routing and forwarding (VRF) functions in the edge router at which traffic is received in a particular service zone and a plurality of attachment circuits connected between VRF functions and service instances, each VRF function storing data maintaining a corresponding one of the attachment circuits for traffic flow to and from a corresponding service instance;
a session routing and forwarding (SRF) function that stores session information to select which attachment circuits to use, as stored by the VRF functions, for purposes of directing traffic received at the edge router of the particular service zone to service instances and receiving traffic back from the service instances, the session information representing assignment of packet sessions to attachment circuits for delivery to service instances according to session flow parameters of the packets; and
after creation of the service chain, an edge router of the particular service zone configured to:

receive traffic at an edge router in the particular service zone;

direct the traffic to a service instance in the particular service zone;

receive traffic back from the service instance in the particular service zone; forward the traffic on from the particular service zone; and determine which of the plurality of service instances to direct the traffic to in the particular service zone.

14. The system of claim 13, wherein a given service chain is configured to:

dynamically insert and/or remove one or more service instances in the given service chain to horizontally scale the given service chain;

dynamically increase and/or reduce a capacity of one or more service instances in the given service chain according to demand changes for the one or more service instances to vertically scale the given service chain; and within the particular service zone, dynamically adjust routing, forwarding and service capacity by adding and/or removing on or more VRF functions and associated SRF functions based on the horizontally scaling and the vertically scaling.

15. The system of claim 13, wherein the edge router of the first service zone is configured to:

receive a route advertisement from an edge router of the second service zone or destination network, the route advertisement advertising a destination network prefix of the second service zone or destination network tagged with the route target for the second service zone; and import the destination network prefix advertised for the second service zone or destination network based on the route advertisement received from the edge router of the second service zone.

16. The system of claim 13, wherein the edge routers of the service zones are physical routers or virtual routers.

17. The system of claim 13, wherein the re-originated route advertisement learned from the edge router of the second service zone is advertised to an edge router of the third service zone or source network, the re-originated route advertisement including information indicating the destination network prefix of the second service zone, an address of the edge router for the first service zone as the forwarding next hop and the route target of the first service zone.

18. The system of claim 13, wherein the traffic received at an edge router of the particular service zone is received at a VRF function of the edge router of the particular service zone, wherein the traffic is directed to a service instance in the particular service zone by:

passing the packets to the SRF function in the particular service zone function;

the SRF function matching session flow parameters of the packets against the session information; and passing the packets back to the VRF function with appropriate session information; and the VRF function forwarding packets over attachment circuits to service instances according to the session information.

* * * * *